United States Patent
Al-Shaer et al.

(10) Patent No.: US 10,284,580 B2
(45) Date of Patent: May 7, 2019

(54) MULTIPLE DETECTOR METHODS AND SYSTEMS FOR DEFEATING LOW AND SLOW APPLICATION DDOS ATTACKS

(71) Applicants: Ehab Al-Shaer, Charlotte, NC (US); Qi Duan, Charlotte, NC (US)

(72) Inventors: Ehab Al-Shaer, Charlotte, NC (US); Qi Duan, Charlotte, NC (US)

(73) Assignee: The University Of North Carolina At Charlotte, Charlotte, NC (US)

(*) Notice: Subject to any disclaimer, the term of this patent is extended or adjusted under 35 U.S.C. 154(b) by 148 days.

(21) Appl. No.: 15/586,967

(22) Filed: May 4, 2017

(65) Prior Publication Data
US 2017/0324757 A1    Nov. 9, 2017

Related U.S. Application Data

(60) Provisional application No. 62/331,563, filed on May 4, 2016.

(51) Int. Cl.
*H04L 29/06* (2006.01)
*H04L 29/08* (2006.01)

(52) U.S. Cl.
CPC ...... *H04L 63/1416* (2013.01); *H04L 63/1425* (2013.01); *H04L 63/1433* (2013.01); *H04L 63/1458* (2013.01); *H04L 67/18* (2013.01)

(58) Field of Classification Search
None
See application file for complete search history.

(56) References Cited

U.S. PATENT DOCUMENTS

| | | | |
|---|---|---|---|
| 6,873,600 B1* | 3/2005 | Duffield | H04L 43/50 370/252 |
| 7,668,097 B2* | 2/2010 | Gross | H04L 69/22 370/234 |
| 7,792,770 B1* | 9/2010 | Phoha | G06N 20/00 706/45 |
| 9,106,479 B1* | 8/2015 | Mukerji | H04L 29/08072 |
| 2012/0072983 A1* | 3/2012 | McCusker | H04L 63/126 726/22 |

(Continued)

OTHER PUBLICATIONS

Fu, Xinwen et al. Active Traffic Analysis Attacks and Countermeasures. 2003 International Conference on Computer Networks and Mobile Computing, ICCNMC 2003. https://ieeexplore.ieee.org/stamp/stamp.jsp?tp=&arnumber=1243024 (Year: 2003).*

(Continued)

*Primary Examiner* — Jeremiah L Avery
(74) *Attorney, Agent, or Firm* — Clements Bernard Walker PLLC; Christopher L. Bernard

(57) ABSTRACT

Methods and systems for detecting and defeating a low and slow application DDoS attack, comprising: computing the Entropy of a plurality of detectors, at least in part selected from a group Geo detector, a group response size detector, a group preference detector, and an individual client behavior detector, wherein the plurality of detectors each describe a feature of traffic affected by the DDoS attack; composing the plurality of detectors on one or more of a Receiver Operating Characteristic (ROC) curve basis and a correlation basis; and implementing a countermeasure to mitigate the DDoS attack.

26 Claims, 2 Drawing Sheets

(56) References Cited

U.S. PATENT DOCUMENTS

| | | | | |
|---|---|---|---|---|
| 2014/0157405 A1* | 6/2014 | Joll | .................... | H04L 63/1425 |
| | | | | 726/22 |
| 2015/0161398 A1* | 6/2015 | De Cristofaro | ......... | G06F 21/60 |
| | | | | 726/26 |
| 2015/0379264 A1* | 12/2015 | Alme | .................... | G06F 21/564 |
| | | | | 726/23 |
| 2016/0006755 A1* | 1/2016 | Donnelly | ............ | H04L 63/0263 |
| | | | | 726/1 |
| 2016/0080404 A1* | 3/2016 | Kohout | ............... | H04L 63/1425 |
| | | | | 726/23 |
| 2016/0164912 A1* | 6/2016 | Del Fante | ........... | H04L 63/1416 |
| | | | | 726/23 |
| 2016/0359872 A1* | 12/2016 | Yadav | .................... | H04L 43/04 |

OTHER PUBLICATIONS

Sreenath, Dr. N. et al. Countermeasures against Multicast Attacks on Enhanced-On Demand Multicast Routing Protocol in MANETs. 2012 International Conference on Computer Communication and Informatics. https://ieeexplore.ieee.org/stamp/stamp.jsp?tp=&arnumber=6158860 (Year: 2012).*

Raymond, David R.; Midkiff, Scott F. IEEE Pervasive Computing, vol. 7, Issue: 1. https://ieeexplore.ieee.org/stamp/stamp.jsp?tp=&arnumber=4431860 (Year: 2008).*

Robinson, Rejimol R. R.; Thomas, Ciza. Evaluation of Mitigation Methods for Distributed Denial of Service Attacks. 2012 7th IEEE Conference on Industrial Electronics and Applications (ICIEA). https://ieeexplore.ieee.org/stamp/stamp.jsp?tp=&arnumber=6360818 (Year: 2012).*

* cited by examiner

US 10,284,580 B2

MULTIPLE DETECTOR METHODS AND SYSTEMS FOR DEFEATING LOW AND SLOW APPLICATION DDOS ATTACKS

CROSS-REFERENCE TO RELATED APPLICATION

The present patent application/patent claims the benefit of priority of U.S. Provisional Patent Application No. 62/331,563, filed on May 4, 2016, and entitled "MULTIPLE DETECTOR COMPOSITION AGAINST LOW AND SLOW APPLICATION DDOS ATTACKS," the contents of which are incorporated in full by reference herein.

FIELD OF THE INVENTION

The present invention relates generally to multiple detector methods and systems for defeating low and slow application Distributed Denial of Service (DDoS) attacks.

BACKGROUND OF THE INVENTION

Low and slow DDoS attacks targeting critical services can cause serious problems. In low and slow DDoS attacks, computer criminals mimic legitimate client behavior by sending proper-looking requests via compromised and commandeered hosts. These low and slow DDoS attacks exploit the fact that many Internet servers have "open clientele" (i.e., they cannot tell a good client from the request alone), and force the victim server to spend much of its resources on spurious requests. The main properties of low and slow DDoS attacks are: (1) they are large scale, since the attacks can be launched from a large number of bots, and (2) they are stealthy (i.e., low volume), since the attack traffic is undetectable using browser fingerprinting, as the attack requests are generated from legitimate browsers (e.g., using man-in-the-browser malware), are undetectable at the server level since individual attack flow looks legitimate, and are undetectable at the network level since the flow volume is small.

Thus, what are still needed in the art are improved multiple detector methods and systems for defeating low and slow application DDoS attacks.

BRIEF SUMMARY OF THE INVENTION

In general, DDoS attack traffic always tends to change the normal behaviors of various traffic features. A traffic feature is a distinctive attribute or aspect of the traffic information that can be extracted from the web logs or traces. In various exemplary embodiments, the present invention uses an Entropy measure as a metric to identify features that can be used in identifying low and slow DDoS attacks. The following features are selected in some exemplary embodiments of the detectors described herein:
client Geo IP,
request time (i.e., the time when the request is made),
response size (i.e., the size of the server response packets),
response time (i.e., the time or the server to respond the request),
user preference (i.e., the web page requested), or
user ISP.

In one exemplary embodiment, the present invention provides a method for detecting and defeating a low and slow application DDoS attack, comprising: computing the Entropy of a plurality of detectors, at least in part selected from a group Geo detector, a group response size detector, a group preference detector, and an individual client behavior detector, wherein the plurality of detectors each describe a feature of traffic affected by the DDoS attack; composing the plurality of detectors on one or more of a Receiver Operating Characteristic (ROC) curve basis and a correlation basis; and implementing a countermeasure to mitigate the DDoS attack. The Geo detector comprises one or more of country, state, city, latitude, and longitude information that is obtained from an IP to location mapping database. The Geo detector comprises a normal traffic profile representing a conditional Entropy conditioned on one or more of time, preference, and ISP and a current traffic profile representing a conditional Entropy conditioned on one or more of time, preference, and ISP. The Geo detector compares the current traffic profile to the normal traffic profile and raises an alarm if a predetermined threshold difference is met or exceeded. The response size detector is based on one or more of location and time and is obtained from a web log. The response size detector compares a current traffic profile to a normal traffic profile and raises an alarm if a predetermined threshold difference is met or exceeded. The preference detector is based on one or more of location and time and is obtained from a web log. The preference detector compares a current traffic profile to a normal traffic profile and raises an alarm if a predetermined threshold difference is met or exceeded. The client behavior detector comprises a consecutive requested resources sub-detector that is a Markov chain of consecutive requested resources of individual users and an inter-arrival time sub-detector that is a Markov chain of time length between consecutive requests. The client behavior detector compares an Entropy of a Markov chain of a current traffic profile to an Entropy of a Markov chain of a normal traffic profile and raises an alarm if a predetermined threshold difference is met or exceeded. The ROC curve basis for composing the plurality of detectors comprises, for every detector, estimating a true positive rate and a false positive rate for different threshold values based on a history profile, drawing an ROC curve, and selecting detectors and thresholds based on the ROC curve and predetermined constraints. The correlation basis for composing the plurality of detectors comprises calculating an evasion resistance of the detectors and combining them with a weighted sum to provide a trigger for alarm, wherein the alarm is triggered if one or more of a summation of a weighted risk of all detectors meets or exceeds a threshold and a threshold number of individual above-threshold detectors is met or exceeded. Optionally, the countermeasure implemented is based on a weighted risk value.

In another exemplary embodiment, the present invention provides a system for detecting and defeating a low and slow application DDoS attack, comprising: a processor executing instructions to: compute the Entropy of a plurality of detectors, at least in part selected from a group Geo detector, a group response size detector, a group preference detector, and an individual client behavior detector, wherein the plurality of detectors each describe a feature of traffic affected by the DDoS attack; compose the plurality of detectors on one or more of a Receiver Operating Characteristic (ROC) curve basis and a correlation basis; and implement a countermeasure to mitigate the DDoS attack. The Geo detector comprises one or more of country, state, city, latitude, and longitude information that is obtained from an IP to location mapping database. The Geo detector comprises a normal traffic profile representing a conditional Entropy conditioned on one or more of time, preference, and ISP and a current traffic profile representing a conditional Entropy conditioned on one or more of time, preference, and ISP. The Geo detector compares the current traffic profile to the normal traffic profile and raises an alarm if a predetermined threshold difference is met or exceeded. The response size detector is based on one or more of location and time and is obtained from a web log. The response size detector compares a current traffic profile to a normal traffic profile and raises an alarm if a predetermined threshold difference is met or exceeded. The preference detector is based on one or more of location and time and is obtained from a web log. The preference detector compares a current traffic profile to a normal traffic profile and raises an alarm if a predetermined threshold difference is met or exceeded. The client behavior detector comprises a consecutive requested resources sub-detector that is a Markov chain of consecutive requested resources of individual users and an inter-arrival time sub-detector that is a Markov chain of time length between consecutive requests. The client behavior detector compares an Entropy of a Markov chain of a current traffic profile to an Entropy of a Markov chain of a normal traffic profile and raises an alarm if a predetermined threshold difference is met or exceeded. The ROC curve basis for composing the plurality of detectors comprises, for every detector, estimating a true positive rate and a false positive rate for different threshold values based on a history profile, drawing an ROC curve, and selecting detectors and thresholds based on the ROC curve and predetermined constraints. The correlation basis for composing the plurality of detectors comprises calculating an evasion resistance of the detectors and combining them with a weighted sum to provide a trigger for alarm, wherein the alarm is triggered if one or more of a summation of a weighted risk of all detectors meets or exceeds a threshold and a threshold number of individual above-threshold detectors is met or exceeded. Optionally, the countermeasure implemented is based on a weighted risk value.

BRIEF DESCRIPTION OF THE DRAWINGS

The present invention is illustrated and described herein with reference to the various drawings, in which like reference numbers are used to denote like method steps/system components, as appropriate, and in which.

DETAILED DESCRIPTION OF THE INVENTION

Figure 1:
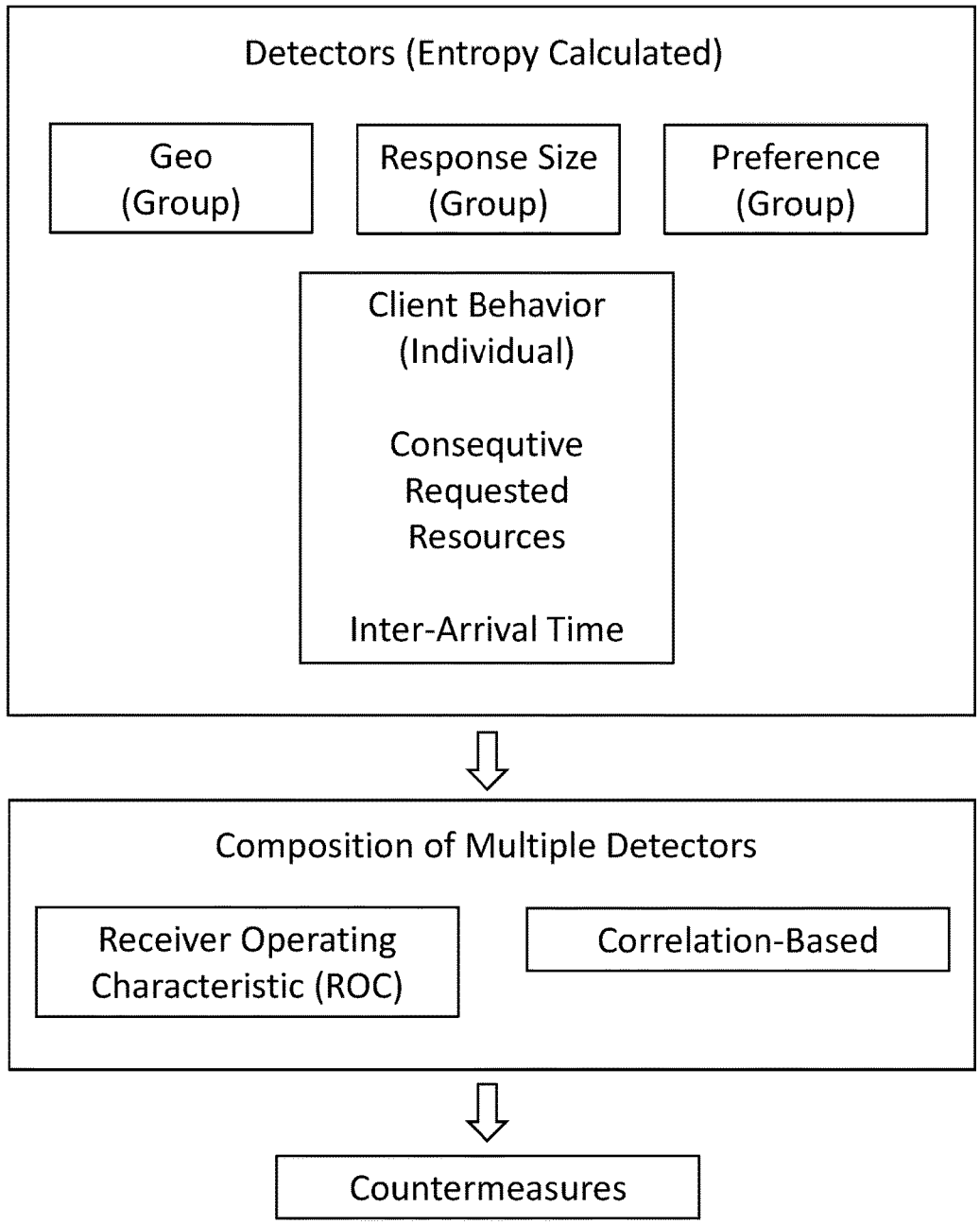
FIG. 1 shows one exemplary embodiment of the flow architecture of the methods and systems of the present invention.

Referring now specifically to FIG. 1, in one exemplary embodiment, the detectors used herein may be classified into two categories based on the behaviors involved: group or individual. Group detectors are based on the collective behavior of all users using the aggregate traffic, and individual detectors are based on individual user behavior. The following describes the detectors:

A. Geo detectors (Group) compute the Entropy of Geo IP given time (denoted D(Geo|time)), preference (denoted D(Geo|preference)), or ISP (denoted D(Geo|ISP)). The following are the steps to construct these detectors:

(1) The Geo IP of the client includes country, state, city, latitude, and longitude, which can be obtained by the IP to location (ip2loc) mapping database. That is, Geo (user)=ip2loc(IP).

(2) We build the normal profile of the detector by calculating the conditional Entropy of Geo IP conditioned on time, preference, or ISP, which is:

$\Sigma_j q_j \Sigma_i p_i \log p_i$, where $p_i$ is the percentage of the requests with the ith Geo IP over total number of requests and $q_j$ is the percentage of requests with the jth time, preference, or ISP.

(3) For the current traffic, we also calculate the Entropy of user Geo IP based on time, preference, or ISP.

(4) We compare the current traffic distribution and normal profile distribution by calculating the difference between them. If the difference is larger than the threshold, we trigger the alarm for possible attack.

B. Response Size detectors (Group), given location (denoted as D(size|location)) or time (denoted D(size|time)). The steps to construct these detectors are similar to the Geo detectors, the only difference is that the response size can be directly obtained from the web log.

C. Preference detectors (Group), given location (denoted as D(preference|location)) or time (denoted as D(preference|time)). The steps to construct these detectors are similar to the Response Size detectors.

D. Client Behavior detectors (Individual), which contain sub-detectors:

Consecutive requested resources, which is the Markov chain of consecutive requested resources of individual users (denoted as D(consecutive resource)); and Inter-arrival time, which is the Markov chain of time length between consecutive requests (denoted as D(inter-arrival time)).

The steps to construct these detectors are similar to the Response Size detectors, the only difference is that the difference is measured on the difference of Entropy of Markov chains between the normal profile and current traffic.

The Composition of Multiple Detectors:

(A) Receiver Operating Characteristic (ROC) curve based composition. The main idea is to model the problem as a constraint satisfaction problem to achieve desired detection effectiveness with bounded cost based on the ROC curve of multiple detectors. The following are the steps:

(1) For every detector, estimate the true positive rate (T) and false positive rate (F) for different threshold values, based on a history profile (e.g., log files). Here true positive rate T=TP/(TP+FN), where TP is the number of true positives and FN is the number of false negatives. The false positive rate F=FP/(TP+FP), where FP is the number of false positives.

(2) Draw the ROC curve for the detectors.

(3) Select the detectors and threshold for the detectors based on the ROC curve and the following constraints:

$$1-\Pi_i(1-v_i T_{jk}^i) > \Delta_{1j}, \text{ for all } j \quad (1)$$

$$\Pi_i(1-v_i+v_i F_{jk}^i) < \Delta_{2j}, \text{ for all } j \quad (2)$$

$$\Sigma_i C_i v_i < \Delta_3 \quad (3)$$

$$v_i \in \{0,1\} \quad (4)$$

Here $T_{jk}^i$ is the true positive rate for detector i against attack j with threshold k, $F_{jk}^i$ is the false positive rate for detector i against attack j with threshold k, $C_i$ is the cost for detector i, and $v_i$ is the variable to denote whether detector i is selected or not. $\Delta_1, \Delta_2,$ and $\Delta_3$ are user specified thresholds. Equations (1) and (2) guarantee that the true positive rate and false positive rate should be bounded by user defined thresholds. Equation (3) guarantees that the total cost of the detectors should be bounded. Equation (4) specifies the range of variable $v_i$.

B. Correlation-Based Composition. The main idea here is to measure the evasion resistance of multiple detectors and combine them with a weighted sum to provide the trigger for alarm or mitigation. The following are the steps:

(1) For every detector i, calculate the evasion resistance:

$$\sigma_i = (t_i - s_i)/(t_i - b_i) \quad (5)$$

where $t_i$ is the threshold, $s_i$ is the standard deviation of normal profile, and $b_i$ is the base line.

(2) Calculate the normalized evasion resistance for detector i as:

$$n_i = c_i/(c_1 + \ldots + c_k) \quad (6)$$

where k is the number of detectors.

(3) For the current traffic calculate the weighted risk for detector i as:

$$=\eta = n_i(c_i - t_i)/(t_i - b_i) \quad (7)$$

where $c_i$ is the current traffic value for detector i.

(4) Two methods can be used for alarm trigger. We can either calculate the summation of the weighted risk of all detectors ($\Sigma_i = \eta$), and trigger the alarm if it is larger than the threshold, or set the threshold for every detector, and trigger the alarm if the number of above-threshold detectors is above a threshold.

Note that countermeasures can also be based on the weighted risk. Different countermeasures (such as CAPTCHA, Re-Authentication, Blacklist, Proxy Mutation, etc.) can be triggered by different risk values.

DDoS attacks can be categorized into three non-mutually exclusive categories: (1) Volumetric based attacks, (2) Semantic based attacks, and (3) Blended Traffic based attacks. For volumetric based attacks, existing countermeasures include Black Listing and Rate Limiting. However, they cannot detect low and slow DDoS attacks. For semantic based attacks, existing countermeasures include behavior monitoring to identify anomaly and proactive resource release. However, behavior monitoring may fail to detect low and slow DDoS attacks if the specified feature is below threshold and proactive resource release may inadvertently disrupt legitimate users. For blended traffic based attacks, existing countermeasures include feature profiling, source authentication, bandwidth currency, protocol pattern matching, and source verification. However, feature profiling based measures have static baseline profiles which may not be able to detect adaptive attackers. Source authentication is not applicable to large scale attacks. Bandwidth currency is not applicable to low DDoS attacks. Protocol pattern matching is too costly and inefficient. Source verification is intrusive and reduces application productivity. The techniques of the present invention utilizing detector and mitigation composition are more robust and resilient than existing approaches in defending low and slow DDoS attacks since we consider multiple attack features and mitigation techniques simultaneously and apply formal method based approaches to minimize false negative/positive and maximize benefits.

Figure 2:
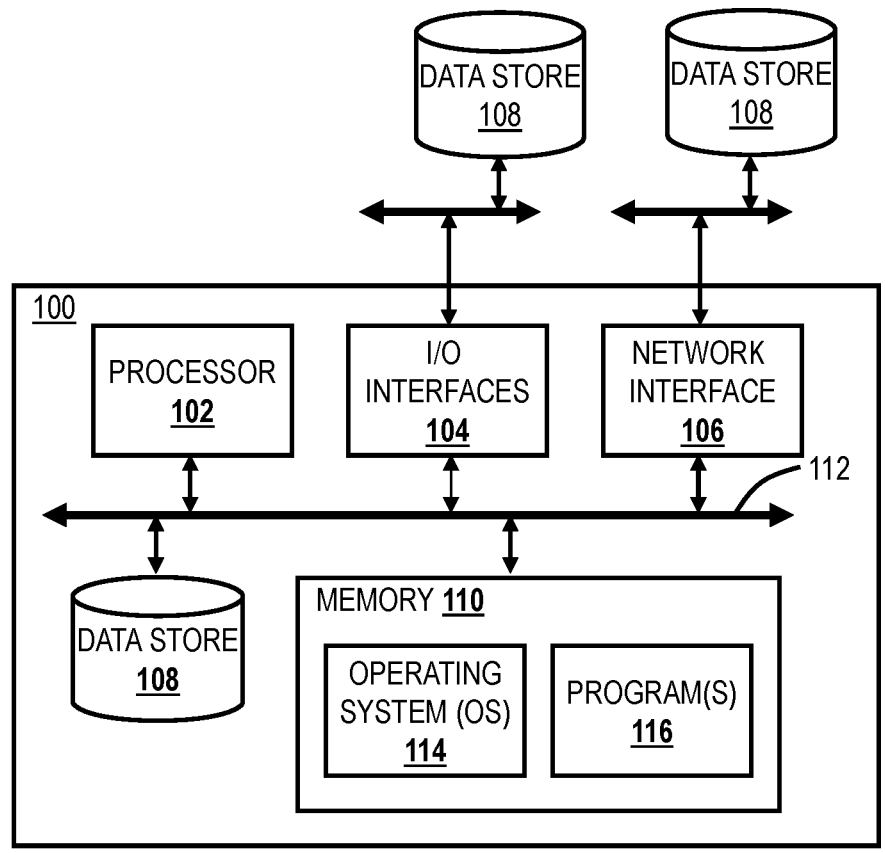
FIG. 2 shows one exemplary embodiment of a hardware environment in which the methods and systems of the present invention can be implemented.

Referring now specifically to FIG. 2, in one exemplary embodiment, one or more servers 100 may be used in conjunction with the methods and systems of the present invention. Each server 100 may be a digital computer that, in terms of hardware architecture, generally includes a processor 102, input/output (I/O) interfaces 104, a network interface 106, a data store 108, and memory 110. It should be appreciated by those of ordinary skill in the art that FIG. 2 depicts the server 100 in an oversimplified manner, and a practical embodiment may include additional components and suitably configured processing logic to support known or conventional operating features that are not described in detail herein. The components (102, 104, 106, 108, and 110) are communicatively coupled via a local interface 112. The local interface 112 may be, for example, but not limited to, one or more buses or other wired or wireless connections, as is known in the art. The local interface 112 may have additional elements, which are omitted for simplicity, such as controllers, buffers (caches), drivers, repeaters, and receivers, among many others, to enable communications. Further, the local interface 112 may include address, control, and/or data connections to enable appropriate communications among the aforementioned components.

The processor 102 is a hardware device for executing software instructions. The processor 102 may be any custom made or commercially available processor, a central processing unit (CPU), an auxiliary processor among several processors associated with the server 100, a semiconductor-based microprocessor (in the form of a microchip or chip set), or generally any device for executing software instructions. When the server 100 is in operation, the processor 102 is configured to execute software stored within the memory 110, to communicate data to and from the memory 110, and to generally control operations of the server 100 pursuant to the software instructions. The I/O interfaces 104 may be used to receive user input from and/or for providing system output to one or more devices or components. User input may be provided via, for example, a keyboard, touchpad, and/or a mouse. System output may be provided via a display device and a printer (not shown). I/O interfaces 104 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 106 may be used to enable the server 100 to communicate on a network, such as the Internet. The network interface 106 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 106 may include address, control, and/or data connections to enable appropriate communications on the network. A data store 108 may be used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media. In one example, the data store 108 may be located internal to the server 100 such as, for example, an internal hard drive connected to the local interface 112 in the server 100. Additionally, in another embodiment, the data store 108 may be located external to the server 100 such as, for example, an external hard drive connected to the I/O interfaces 104 (e.g., SCSI or USB connection). In a further embodiment, the data store 108 may be connected to the server 100 through a network, such as, for example, a network attached file server.

The memory 110 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 110 may incorporate electronic, magnetic, optical, and/or other types of storage media. Note that the memory 110 may have a distributed architecture, where various components are situated remotely from one another but can be accessed by the processor 102. The software in memory 110 may include one or more software programs, each of which includes an ordered listing of executable instructions for implementing logical functions. The software in the memory 110 includes a suitable operating system (O/S) 114 and one or more programs 116. The operating system 114 essentially controls the execution of other computer programs, such as the one or more programs 116, and provides scheduling, input-output control, file and data management, memory management, and communication control and related services. The one or more programs 116 may be configured to implement the various processes, algorithms, methods, techniques, etc. described herein.

Although the present invention is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims.

What is claimed is:

1. A method for detecting and defeating a low and slow application Distributed Denial of Service (DDoS) attack, comprising:
   computing an Entropy of a plurality of detectors comprising a plurality of a group Geo detector, a group response size detector, a group preference detector, and an individual client behavior detector, wherein the plurality of detectors each describe a feature of traffic affected by the DDoS attack;
   composing the plurality of detectors on one or more of a Receiver Operating Characteristic (ROC) curve basis and a correlation basis; and
   implementing a countermeasure to mitigate the DDoS attack.

2. The method of claim 1, wherein the Geo detector comprises one or more of country, state, city, latitude, and longitude information that is obtained from an IP to location mapping database.

3. The method of claim 1, wherein the Geo detector comprises a normal traffic profile representing a conditional Entropy conditioned on one or more of time, preference, and ISP and a current traffic profile representing a conditional Entropy conditioned on one or more of time, preference, and ISP.

4. The method of claim 3, wherein the Geo detector compares the current traffic profile to the normal traffic profile and raises an alarm if a predetermined threshold difference is met or exceeded.

5. The method of claim 1, wherein the group response size detector is based on one or more of location and time and is obtained from a web log.

6. The method of claim 5, wherein the group response size detector compares a current traffic profile to a normal traffic profile and raises an alarm if a predetermined threshold difference is met or exceeded.

7. The method of claim 1, wherein the group preference detector is based on one or more of location and time and is obtained from a web log.

8. The method of claim 7, wherein the group preference detector compares a current traffic profile to a normal traffic profile and raises an alarm if a predetermined threshold difference is met or exceeded.

9. The method of claim 1, wherein the client behavior detector comprises a consecutive requested resources sub-detector that is a Markov chain of consecutive requested resources of individual users and an inter-arrival time sub-detector that is a Markov chain of time length between consecutive requests.

10. The method of claim 9, wherein the client behavior detector compares an Entropy of a Markov chain of a current traffic profile to an Entropy of a Markov chain of a normal traffic profile and raises an alarm if a predetermined threshold difference is met or exceeded.

11. The method of claim 1, wherein the ROC curve basis for composing the plurality of detectors comprises, for every detector, estimating a true positive rate and a false positive rate for different threshold values based on a history profile, drawing an ROC curve, and selecting detectors and thresholds based on the ROC curve and predetermined constraints.

12. The method of claim 1, wherein the correlation basis for composing the plurality of detectors comprises calculating an evasion resistance of the detectors and combining them with a weighted sum to provide a trigger for alarm, wherein the alarm is triggered if one or more of a summation of a weighted risk of all detectors meets or exceeds a threshold and a threshold number of individual above-threshold detectors is met or exceeded.

13. The method of claim 1, wherein the countermeasure implemented is based on a weighted risk value.

14. A system for detecting and defeating a low and slow application Distributed Denial of Service (DDoS) attack, comprising:
   a processor executing instructions to:
      compute an Entropy of a plurality of detectors comprising a plurality of a group Geo detector, a group response size detector, a group preference detector, and an individual client behavior detector, wherein the plurality of detectors each describe a feature of traffic affected by the DDoS attack;
      compose the plurality of detectors on one or more of a Receiver Operating Characteristic (ROC) curve basis and a correlation basis; and
      implement a countermeasure to mitigate the DDoS attack.

15. The system of claim 14, wherein the Geo detector comprises one or more of country, state, city, latitude, and longitude information that is obtained from an IP to location mapping database.

16. The system of claim 14, wherein the Geo detector comprises a normal traffic profile representing a conditional Entropy conditioned on one or more of time, preference, and ISP and a current traffic profile representing a conditional Entropy conditioned on one or more of time, preference, and ISP.

17. The system of claim 16, wherein the Geo detector compares the current traffic profile to the normal traffic profile and raises an alarm if a predetermined threshold difference is met or exceeded.

18. The system of claim 14, wherein the group response size detector is based on one or more of location and time and is obtained from a web log.

19. The system of claim 18, wherein the group response size detector compares a current traffic profile to a normal traffic profile and raises an alarm if a predetermined threshold difference is met or exceeded.

20. The system of claim 14, wherein the group preference detector is based on one or more of location and time and is obtained from a web log.

21. The system of claim 20, wherein the group preference detector compares a current traffic profile to a normal traffic profile and raises an alarm if a predetermined threshold difference is met or exceeded.

22. The system of claim 14, wherein the client behavior detector comprises a consecutive requested resources sub-detector that is a Markov chain of consecutive requested resources of individual users and an inter-arrival time sub-detector that is a Markov chain of time length between consecutive requests.

23. The system of claim 22, wherein the client behavior detector compares an Entropy of a Markov chain of a current traffic profile to an Entropy of a Markov chain of a normal traffic profile and raises an alarm if a predetermined threshold difference is met or exceeded.

24. The system of claim 14, wherein the ROC curve basis for composing the plurality of detectors comprises, for every detector, estimating a true positive rate and a false positive rate for different threshold values based on a history profile, drawing an ROC curve, and selecting detectors and thresholds based on the ROC curve and predetermined constraints.

25. The system of claim 14, wherein the correlation basis for composing the plurality of detectors comprises calculating an evasion resistance of the detectors and combining them with a weighted sum to provide a trigger for alarm, wherein the alarm is triggered if one or more of a summation of a weighted risk of all detectors meets or exceeds a threshold and a threshold number of individual above-threshold detectors is met or exceeded.

26. The system of claim 14, wherein the countermeasure implemented is based on a weighted risk value.

* * * * *